THIN FILM STRUCTURE AND METHOD OF MAKING SAME

Filed March 24, 1961

INVENTORS.
NATHAN PRITIKIN
BERNARD FELDMAN
BY THEIR ATTORNEYS.
HARRIS, KIECH, RUSSELL & KERN 3,134,689
THIN FILM STRUCTURE AND METHOD OF MAKING SAME

Nathan Pritikin, Santa Barbara, and Bernard Feldman, Ventura, Calif., assignors to Intellux Inc., Santa Barbara, Calif., a corporation of California Filed Mar. 24, 1961, Ser. No. 98,075
13 Claims. (Cl. 117—212)

This invention relates to thin film structures for circuit components and to methods of making such structures.

Typically a film structure will comprise a base or substrate and a working film deposited on the substrate. The substrate is relatively thick and provides a mechanical support for the film. The film will have the necessary electrical or magnetic characteristics required for its use as a circuit component. Also, an additional film may be deposited over the working film to provide mechanical and/or electrical protection for the working film and to isolate the working film from the surrounding atmosphere.

Typical uses of thin film structures are in resistors, capacitors, inductors, switching arrangements, and magnetic elements.

The working film may be selected for its conductive, magnetic or dielectric properties. Typically, working films may be formed by conventional sputtering or vaporizing techniques, by pyrolytic deposition of carbon and borocarbon, and by iridizing, the latter technique being more fully described in U.S. Patent to Pritikin and Camp No. 2,818,354, Electrical Resistor and Method of Making Same. Various noble metals may be used for conducting films as conductors and resistors; semi-conductor materials such as indium antimonide and indium arsenide are used in film form for many applications; films of nickel and iron mixtures are presently being used for formation of various magnetic elements; iridized tin oxide films and tin and antimony oxide films are often used in resistors.

The substrate on which the film is deposited is an insulator or a conductor having an insulating coating thereon. Typically, substrates are formed of ceramics such as porcelain or glass and ordinarily are selected to be mechanically strong and stable and to have electrical characteristics which do not affect the function of the working film. The stability of film coatings, particularly at elevated temperatures, is dependent to a considerable degree upon the properties of the substrate. This effect is particularly significant in resistors of higher resistance values. It has been noted as early as 1942 that the conductivity and hence the dielectric loss of glasses increases rapidly with temperature. The extent of this change varies widely with glasses, the soft glasses which contain the highest concentration of alkali metals having the greatest dielectric loss and the greatest increase of conductivity with temperature. See, for example, the article entitled "Dielectric Behavior of Some Ceramic Materials," by S. O. Morgan, in Ceramic Age, March 1942, page 70 et seq. From subsequent investigations, it appeared that the decrease in resistance of substrate material at elevated temperatures resulted from electrolytic polarization within the substrate material and in order to obtain exceptionally high stability in the thin film structure, it was necessary that the base or substrate material have high volume resistivity at all operating temperatures. It further appeared that the resistivity of the substrate material could be directly correlated to the alkali metal ion content of the material and several substrate materials having no or substantially no alkali metals therein were developed. See U.S. patents to Rigterink, No. 2,386,633, on Ceramic Material, and Jira, No. 2,547,678, on Resistor and Method of Making Same, and the article "Alkaline Earth Porcelains Possessing Low Dielectric Loss," by Rigterink and Grisdale in Journal of the American Ceramic Society, vol. 30, March 1, 1947, page 78 et seq. Other investigations on the effect of alkali metal ions on thin resistive films demonstrated that the decrease in resistivity at elevated temperatures is due to the mobility of alkali metal ions in the glass matrix of the substrate material. See the article "Pyrolytic Film Resistors: Carbon and Borocarbon," by Grisdale et al., published in Bell System Technical Journal, vol. 30, April 1951, page 271, et seq. This effect occurs even though the substrate and working film are sealed in a thoroughly dry and evacuated enclosure. For example, it has been noted that in a thin film resistor using conventional window glass as the substrate, a D.C. voltage applied across the resistor will produce an electrolytic destruction of the film.

As indicated above, the volume resistivity of the substrate material is related to the alkali metal ion content. Conventional window glass will have a volume resistivity at 350° C. of approximately log 5.5 ohm-centimeters. Glasses for use as substrates having a resistivity at 350° C. in the order of log 10 ohm-centimeters are being produced and the adverse effects on the stability of the working films is substantially reduced with such glasses. Generally a glass having a resistivity of log 10 still has some alkali metal ion content and it appears that the maximum limit for resistivity for silicate glasses generally used will be in the order of log 11 or log 12 because of the practical problems in obtaining raw materials completely free of alkali metal oxides for use in making substrates. The Rigterink patent referred to previously indicates that as little as 0.25 percent by weight of alkali metal oxide in the raw materials of a ceramic will cause a noticeable change in its electrical properties.

Referring now to the protective coatings which are sometimes applied over the working film, a typical protective coating comprises a fused film of glass which provides both mechanical protection to the working film and isolation from the surrounding atmosphere. Several types of fused glass coatings are described in the aforesaid patent of Pritikin and Camp, No. 2,818,354. In one preferred method, a glass frit is mixed with a liquid carrier and the mixture is applied to the surface to be covered. The structure is then heated to a temperature to fuse the frit, forming a continuous film over the surface.

The film structures described above are known and various embodiments thereof have been and are being produced. However, alkali metal free substrates are very difficult to obtain. Some substrates having relatively few alkali metal ions are available but these are not suitable for many applications, particularly in the high temperature field. Accordingly, it is an object of the present invention to provide a film structure having a marked improvement in electrical characteristics, particularly at high temperatures. A further object is to provide such a film structure which will also have improved mechanical characteristics. It is a particular object of the invention to provide a new film structure in which the working film is not adversely affected by the presence of alkali metal ions in the substrate. A further object is to provide a film structure which may utilize substrates having relatively high alkali metal ion content as well as substrates substantially free of alkali metal ions. Another object is to provide a film structure which may be utilized in various circuit components including fixed and variable resistors, inductors, switches, magnetic elements, and capacitors. A specific object is to provide new methods of making the film structures of the invention.

It has been found that the adverse effects of alkali metal ions and the resistivity decrease at elevated temperatures can be eliminated by providing an additional film or coating in the film structure between the substrate and the working film, this additional film being a nonconducting iridized metal oxide film. Conducting iridized coatings of metal oxides are not new in film structures, the conducting iridized films being used in resistors as described in the aforesaid patent of Pritikin and Camp. Various metals are used in producing the conducting iridized coatings, including tin, indium, cadmium, and various combinations of these three, with or without small additional quantities of zinc, iron, copper, magnesium, cobalt, vanadium, and antimony. However, a number of metals may be used to produce nonconducting iridized metal oxide films, which films have a resistivity considerably greater than many substrates. Typical nonconducting iridized metal oxide films are antimony oxide and iron oxide. It should be noted that while antimony and tin are used in combination to form a conducting film for use in a resistor, the antimony by itself produces a nonconducting iridized film. The combination of antimony with tin produces a lower resistance film than the tin alone.

The nonconducting iridized metal oxide film disposed between the substrate and the working film also substantially improves the mechanical characteristics of the structure. An iridized film is a crystalline structure having a reticulated surface, i.e., a surface with closely spaced hills and valleys which under magnification closely resemble a crosscut file with rounded peaks. The center-to-center spacing of the peaks is less than a micron, there ordinarily being three to five peaks per micron along the surface of the film. This reticulated surface is admirably suited for receiving the working film and provides for improved adherence thereof. The iridized film is very hard, having a hardness on the Mohs' scale of about 7–9 as compared to glass which has a hardness of 5–6. This hard intermediate film substantially increases the life of film structures when used for switching and similar applications, as will be more fully described hereinbelow.

Accordingly, it is an object of the invention to provide a film structure having improved adherence and mechanical wear life. A further object is to provide a film structure having a nonconducting iridized metal oxide film on the substrate which nonconducting film is itself free of alkali metal ions and which isolates the working film from ion conduction from the stubstrate. A further object is to provide such a structure having a nonconducting iridized metal film on the substrate to serve as a base for a conducting iridized metal film. It is an object of the invention to provide a film structure utilizing a first nonconducting iridized metal oxide film between the substrate and the working film and a second nonconducting iridized metal oxide film between the working film and the protective cover film.

Other objects, advantages, features and results of the invention will more fully appear in the course of the following description. The drawing merely shows and the description merely describes preferred embodiments of the present invention which are given by way of illustration or example.

Figure 1:
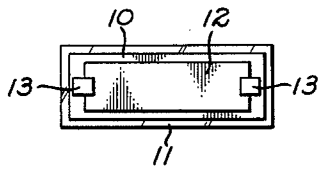
FIG. 1 is a plan view of a film structure illustrating one form of the invention.
Figure 2:
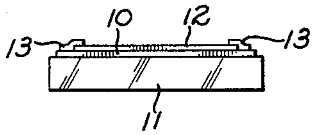
FIG. 2 is a side view of the structure of FIG. 1.

Referring to the structure of FIGS. 1 and 2, a nonconducting iridized metal oxide film 10 is applied to a base or substrate 11 of inorganic insulating material, typically a glass or porcelain. Then a working film 12 is deposited on the nonconducting iridized film 10. The working film may be any of the films discussed above, and here is considered to be a conducting iridized metal oxide film for making a resistor. The particular shape of the working film will depend upon the specific application of the structure. The film may be rectangular, as shown in FIG. 1, or may have a zigzag or other form to increase the path length. Similarly, conventional appropriate shapes may be selected for use of the structure as an inductor or a switching component.

Terminals 13 may be applied to each end of the working film for connecting wires thereto. The terminals may be applied over or under the working film and typically take the form of a paste of glass frit and metallic silver which is fused in place. In some film structures there is no need for terminals, such as when the working film is a film of magnetic material.

Figure 3:
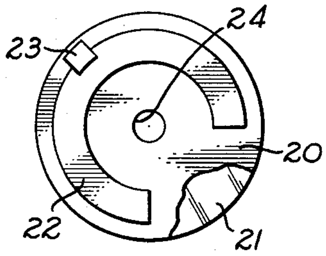
FIG. 3 is a plan view of an alternative form of the invention particularly suited for switching applications.
Figure 4:
FIG. 4 is a side view of the structure of FIG 3.

FIGS. 3 and 4 illustrate an alternative form of the film structure of the invention as used in the commutator plate for a switching unit. A nonconducting iridized metal oxide film 20 is applied to a substrate in the form of a disc 21. A conductive film 22 of appropriate contour is applied over the nonconducting film 20 and a terminal 23 may be provided in contact with the film 22. Alternatively, connections may be made directly to the conducting film 22. The structure of FIGS. 3 and 4 is intended for use in a conventional rotating switch or commutator and the shaft which carries the brush assembly may be mounted in the opening 24.

It should be noted that in the figures of the drawings, the thicknesses of the film structures are greatly exaggerated. Ordinarily, the substrate will be in the order of 1/16 to 1/8 inch thick while the films preferably will be in the order of 500 to 5,000 A., although they can be thicker or thinner. The substrate is somewhat softer than the conducting film and in switching components where the conducting film is applied directly to the substrate, the surface of the substrate becomes badly pitted and gullied due to brush wear. The nonconducting iridized film 20 is as hard or harder than the conducting film 22 and, because of the thinness of the films, presents a substantially continuous hard surface to the brushes so that the life of the switching component is limited by the conducting film and not by the characteristics of the substrate. The structures of FIGS. 1 and 2 and FIGS. 3 and 4 are particularly adapted for use in potentiometers, with the working film being a conducting film of the desired resistance.

Figure 5:
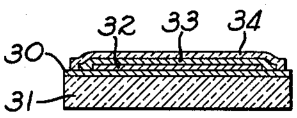
FIG. 5 is a sectional view of another form of the invention wherein the working film is covered by an outer protective coating.

FIG. 5 illustrates another form of the invention wherein the working film is completely enclosed. A nonconducting iridized metal oxide film 30 is applied to a substrate 31. The working film 32 is applied to the nonconducting iridized film 30. Another nonconducting iridized metal oxide film 33 is applied over the working film, after which a protective coating 34, typically fused glass, is applied over the nonconducting iridized film 33. Terminals which contact the working film and extend beyond the protective coating 34 may be added as required. This structure provides a completely sealed working film, which may be a resistor, a conductor, a magnetic element, or the like and also isolates the working film from ion conduction and resistivity changes in the substrate and the protective film 34. In some structures, such as one where the substrate does not adversely affect the working film, the nonconducting iridized metal oxide film 30 may be omitted, with the nonconducting film 33 providing isolation between the working film 32 and the protective coating 34.

The nonconducting iridized metal oxide films 10, 20, 30, 33 are generally produced by mixing a salt of the desired metal in a liquid carrier and spraying this mixture onto a heated glass sheet. The resulting iridized coatings are generally accepted as being formed primarily of the metal oxide, although there is some difference of opinion as to the exact composition. For the purposes of this application, films of this type are referred to herein as "iridized coatings of metal oxides" or "iridized metal oxide films." These expressions are intended merely to indicate this general type of coating and are not to be considered as being limited to any particular molecular arrangement or configuration.

It is felt by some parties that these "iridized metal oxide films" contain the metal and oxygen elements in an arrangement which does not constitute a true oxide of metal. Other parties contend that these coatings are partially metal oxides and partially metal in a pure state or in combination with other elements. Accordingly, the expressions are intended to include this general type of coating regardless of whether the coating is actually a proper metal oxide, speaking in strict chemical terms.

A nonconducting iridized antimony oxide film may be made as follows. A solution of antimony pentachloride in alcohol is prepared comprising 51 cc. $Sb_2Cl_5$ and 240 cc. methanol. The substrate in the form of a sheet of glass is heated to 1150° F. in an oven and immediately upon removal from the oven is sprayed with a coat of the aforesaid solution. The iridized metal oxide film is formed at the heated surface of the substrate and on cooling, the coated substrate is ready for application of the working film. The resulting iridized films are ordinarily in the range of 500 to 5,000 A. thick, with the presently preferred thickness being in the order of 1500 A. In applications where voltage breakdown to the substrate is a problem, a thicker coating may be used.

A nonconducting iridized iron oxide film may be produced by following the above process utilizing a solution of ferric chloride. Such a solution may comprise 95 grams of $FeCl_3$ in 525 cc. of methanol.

The results of tests on resistors made according to the present invention and on conventional resistors are set out in Table I. All of the resistors tested had identical resistive films applied to glass substrates 1/16 x 1/4 x 1/2 inch. Two types of glass were used, as indicated in Table II. The resistance of each resistor was 237,000 ohms at 100° C. The nonconducting iridized metal oxide films used in types 2, 4 and 5 were between 5 and 10,000 A. thick. In the tests, the resistors were cycled 1½ hours on and ½ hour off with 350 volts D.C. applied, to dissipate about one-half watt.

TABLE I

*Resistance Change of Various Resistors on Load Test*

| Duration of Test | Type of Construction | | | | |
|---|---|---|---|---|---|
| | #1 | #2 | #3 | #4 | #5 |
| | *Percent* | *Percent* | *Percent* | *Percent* | *Percent* |
| 250 hours | 2.3 | 0.3 | 0.4 | 0.1 | 0.1 |
| 500 hours | 4.9 | 0.5 | 0.9 | 0.2 | 0.15 |
| 1,000 hours | 14.3 | 4.3 | 2.6 | 0.15 | 0.18 |

TABLE II

*Resistor Type*

(1) Resistive film applied directly to glass substrate with volume resistivity of log 5.5 ohm-centimeters at 350° C.

(2) Resistive film applied over an iridized antimony oxide film on a glass substrate with volume resistivity of log 5.5 ohm-centimeters at 350° C.

(3) Resistive film applied directly to glass substrate with volume resistivity of log 10 ohm-centimeters at 350° C.

(4) Resistive film applied over an iridized antimony oxide film on a glass substrate with volume resistivity of log 10 ohm-centimeters at 350° C.

(5) Resistive film applied over an iridized iron oxide film on a glass substrate with volume resistivity of log 10 ohm-centimeters at 350° C.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. A film structure for a circuit component, comprising:
a substrate of inorganic insulating material substantially free from alkali metal ions;
a first nonconducting iridized metal oxide film on said substrate;
a solid working film on said first nonconducting iridized film;
a second nonconducting iridized metal oxide film on said working film;
and a continuous glass film on said second nonconducting iridized film.

2. A film structure for a circuit component, comprising:
a glass substrate substantially free from alkali metal ions;
a nonconducting iridized metal oxide film on said substrate;
and a conducting iridized metal oxide film on said nonconducting iridized film.

3. A film structure for a resistor, comprising:
a glass substrate substantially free from alkali metal ions;
a first nonconducting iridized metal oxide film on said substrate;
a conducting iridized metal oxide film on said first nonconducting iridized film;
a second nonconducting iridized metal oxide film on said conducting iridized film;
and a continuous glass film on said second nonconducting iridized film.

4. A film structure for a magnetic component of a circuit, comprising:
a substrate of inorganic insulating material substantially free from alkali metal ions;
a first nonconducting iridized metal oxide film on said substrate;
a film of magnetic material on said first nonconducting iridized film;
a second nonconducting iridized metal oxide film on said film of magnetic material;
and a continuous glass film on said second nonconducting iridized film.

5. A film structure for a circuit component, comprising:
a substrate of glass having a volume resistivity of at least about log 10 ohm-centimeters at 350° C.;
a nonconducting iridized antimony oxide film on said substrate;
and a conducting iridized metal oxide film on said nonconducting iridized film.

6. A film structure for a circuit component, comprising:
a substrate of glass having a volume resistivity of at least about log 10 ohm-centimeters at 350° C.;
a nonconducting iridized iron oxide film on said substrate;
and a conducting iridized metal oxide film on said nonconducting iridized film.

7. A film structure for a circuit component, comprising:
a substrate of glass having a volume resistivity of at least about log 10 ohm-centimeters at 350° C.;
a first nonconducting iridized antimony oxide film on said substrate;
a conducting iridized tin oxide film on said first antimony oxide film;
a second nonconducting iridized antimony oxide film on said tin oxide film;
and a continuous unitary glass film secured in intimate molecular contact to the surface of said second antimony oxide film.

8. A film structure for a circuit component, comprising:
a substrate of glass having a volume resistivity of at least about log 10 ohm-centimeters at 350° C.;
a nonconducting iridized antimony oxide film on said substrate;
and a conducting iridized tin and antimony oxide film on said nonconducting iridized film.

9. A film structure for a circuit component, comprising:
a substrate of glass having a volume resistivity of at least about log 10 ohm-centimeters at 350° C.;
a first nonconducting iridized antimony oxide film on said substrate;
a conducting iridized tin and antimony oxide film on said first antimony oxide film;
a second nonconducting iridized antimony oxide film on said tin oxide film;
and a continuous unitary glass film secured in intimate molecular contact to the surface of said second antimony oxide film.

10. A film structure for a circuit component, comprising:
a substrate of inorganic insulating material substantially free from alkali metal ions;
a nonconducting iridized metal oxide film on said substrate;
and a solid working film on said nonconducting iridized film.

11. A film structure for a circuit component, comprising:
a substrate of inorganic insulating material substantially free from alkali metal ions;
a nonconducting iridized metal oxide film on said substrate;

and a conducting iridized metal oxide film on said nonconducting iridized film.

12. A film-type resistance element for a potentiometer, comprising:
a substrate of glass having a volume resistivity of at least about log 10 ohm-centimeters at 350° C.;
a nonconducting iridized metal oxide film on said substrate; and
a conducting iridized metal oxide film on said nonconducting iridized film and having a reticulated surface with peak-to-peak spacings of less than a micron.

13. A film-type switching element for a commutator or the like, comprising:
a substrate of glass having a volume resistivity of at least about log 10 ohm-centimeters at 350° C.;
a nonconducting iridized metal oxide film on a zone of said substrate; and
a conducting iridized metal oxide film on said nonconducting iridized film in a portion of said zone.

References Cited in the file of this patent

UNITED STATES PATENTS

| | | |
|---|---|---|
| 2,617,741 | Lytle | Nov. 11, 1952 |
| 2,927,048 | Pritikin | Mar. 1, 1960 |
| 2,934,736 | Davis | Apr. 26, 1960 |